May 1, 1928.

F. A. EUSTIS 1,668,496

METHOD FOR DISTRIBUTION OF VOLATILE SUBSTANCES

Filed June 3, 1926

Inventor:
Frederic A. Eustis.
by Roberts, Cushman & Woodbury.
Attys.

Patented May 1, 1928.

1,668,496

UNITED STATES PATENT OFFICE.

FREDERIC A. EUSTIS, OF MILTON, MASSACHUSETTS, ASSIGNOR TO VIRGINIA FRUIT FUMIGATING COMPANY, OF WEST NORFOLK, VIRGINIA, A CORPORATION OF VIRGINIA.

METHOD FOR DISTRIBUTION OF VOLATILE SUBSTANCES.

Application filed June 3, 1926. Serial No. 113,426.

This invention relates to a method for the controlled and uniform distribution of volatile materials throughout an enclosed volume of a fluid medium, such as air.

It is a common experience in the industrial arts to encounter the problem of effecting the uniform admixture of two or more fluid substances,—which may be either liquid or gaseous or both. Obviously there are many ways in which this may be accomplished, as by agitating the mixture with sufficient volume or for a prolonged period of time and such is the basis of the usual and customary modes of procedure.

It is also well known that there are innumerable instances in which two or more fluids (either liquid or gaseous) may remain segregated even though they are in free contact and for a long period of time. It is also to be observed that in some instances, even when such fluids are appreciably but not thoroughly mixed, they manifest a decided tendency to separate again into the original components. This is more especially the case when the concentration of one or another of the gases is near its dew point or where a liquid exhibits a high surface tension. Segregation of this sort may also occur or persist upon flowing two or more of the fluids together in the form of an uninterrupted stream, manifesting itself, for example, in the formation of segregated strata.

In order to overcome such inhibitions to the complete mutual diffusion of two fluids it is necessary to impart a more or less violent agitation to their component particles.

In practical operations this ordinarily is facilitated by relatively large, open spaces or volumes in the mixing apparatus, and such spaces may usually be readily and conveniently provided.

In some instances where this problem is encountered, however, such large spaces are not available for the mixing operation, although local segregation must nevertheless be scrupulously avoided and a mutual diffusion of the fluids must be so accomplished as to maintain itself thereafter throughout all parts of the volume under treatment.

For example, it has recently been found that various food products such as fruits and more especially grapes, may be effectively purified and preserved for human consumption by treating with relatively dilute concentrations of chemically active gases. In such procedure it is obvious that local concentrations of the reagent are in themselves objectionable, while any possibility of such concentrations as might bring about condensation of the reagent introduces an element of danger which, if not effectively safeguarded against, would make such treatments too precarious to employ in spite of this certain and generally acknowledged advantage.

Accordingly, it is an object of the present invention to provide a method and means for effecting the diffusion of a volatilizable substance into a fluid (such as an enclosed volume of air) and the uniform distribution of the substance therethrough. It is a further and more specific object of the invention to accomplish this result where the volume to be treated is irregularly disposed and of varying sizes and shapes,—as for example throughout the air spaces around and between materials packed for storage, in vessels or cars for transportation or in individual containers.

Briefly described, the procedure of the invention includes vaporizing the reagent, if necessary, directing the resulting gas into the form of a stream, conducting the stream to and into an intermediate chamber, aspirating a portion of the gas from the main volume with which the volatilized reagent gas is to be mixed, into the gas stream, and conducting the combined stream of gases into a portion of the gaseous space to be treated, preferably at a point remote from that at which the withdrawal of the fluid for introduction into the gas stream takes place.

A typical application of the invention is illustrated in the treatment of goods packed in closed chambers (as in storage or in cars for transportation) with a given amount or concentration of gaseous reagent which in excessive concentrations or amounts may be harmful to the goods or to the containers or to persons who may subsequently open and handle or use the goods. A representative instance of these conditions is presented in the treatment of fruits with diluted sulfur dioxide which is found to have a marked preservative effect thereon. Too great a local concentration is deleterious to the fruit and too great an amount is positively harmful while an insufficient concentration is without the desired effect. Moreover, even a temporary local concentration is to be avoided, since the fruit tends to adsorb the gas and to retain it by absorption in solution after the initial concentration has been diluted or removed out of contact therewith. This is especially the case where any part of the skin is broken so as to expose the fruit juice which is exceedingly absorptive with respect to the gaseous reagent.

A specific adaptation of the invention will be described in the treatment of grapes, as packed and ready for shipment in cars, reference being made to the accompanying drawings, in which.

Figure 2:
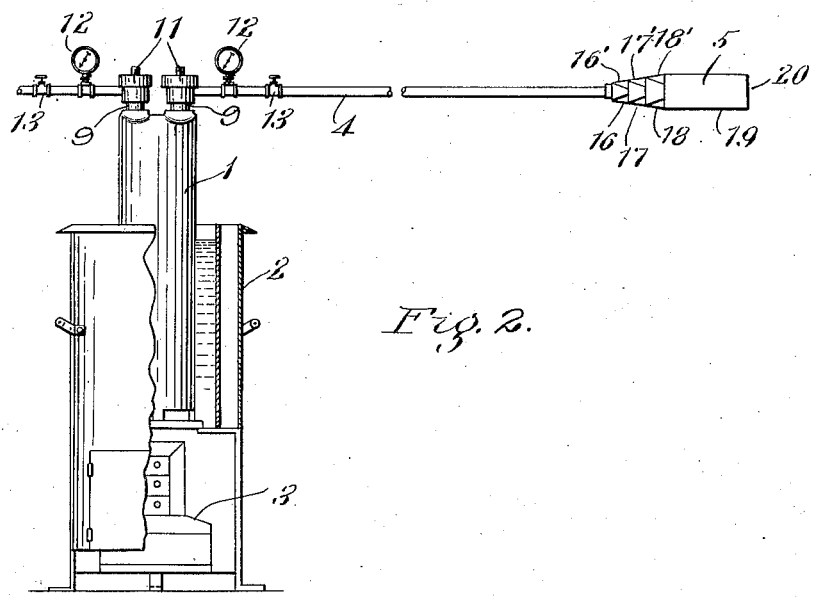
Fig. 2 is a detailed view of the apparatus, with parts broken away and shown in cross section.
Figure 1:
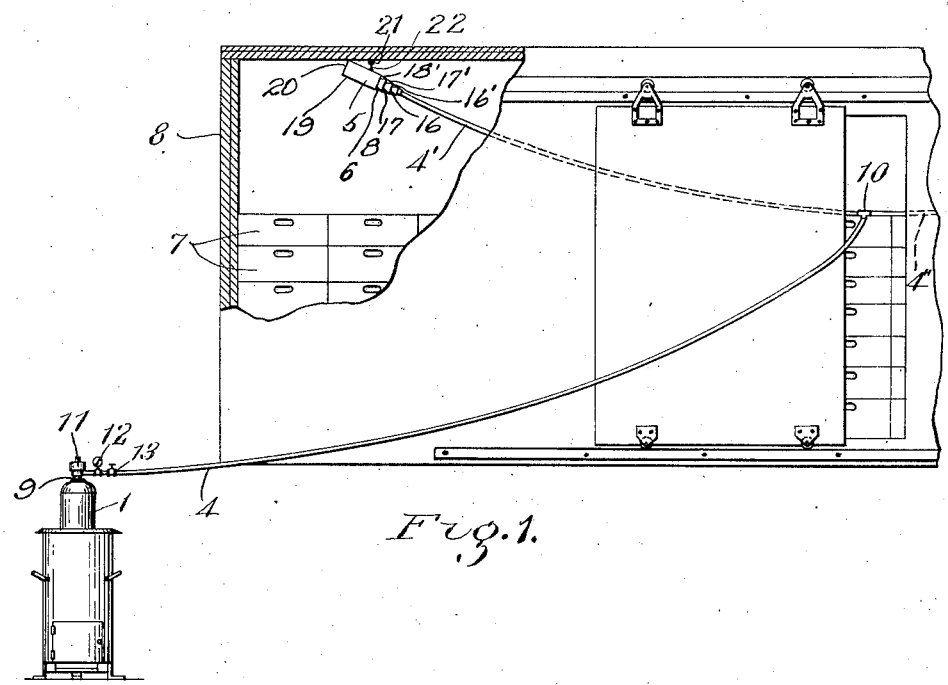
Fig. 1 is a diagrammatic elevation of a box car, as usually packed, with the apparatus disposed therein; parts of the car being broken away.

Referring to the drawings, the apparatus includes a container (in the present instance compressed or liquefied sulfur dioxide cylinder 1 for the supply of gas to be distributed) surrounded by a water bath 2, heated by a stove 3, or other convenient heating device, and provided with flexible tubes 4 leading to aspirating nozzles 5 which are suitably disposed in the open space 6 above the boxes 7, filled with grapes or the like, which are stacked ready for shipment in the box car 8.

The container 1, in the case of using liquefied sulfur dioxide consists of a thick-walled cylinder with one or more outlets 9 at the top, each provided with a stop cock 11, a pressure gauge 12, and a control valve 13 leading to the tube 4. The tube 4 may be connected by a T-union 10 to two or more branch tubes 4′, 4″, at the ends of which are attached the aspirator nozzle 5 (and 5′ not shown). Each of the latter consists of a perforate, generally conical portion, expanding towards the cylindrical portion to which it is attached. The conical portion of the nozzle contains successive concentric conical apertures (or conical hoods with central apertures therein) 16, 17, 18, directed toward the cylindrical portion 19 and having spaces 16′, 17′, 18′ therebetween which are open at their peripheries to admit the surrounding fluid medium thereinto. The cylindrical portion has an unobstructed outlet at 20. The nozzle is provided with the staple 21 and cord 22 by which it is temporarily attached to the car roof.

In operation the container 1 (filled with sulfur dioxide in the usual manner) is placed in the water bath 2 which is filled with water. The container may advantageously be raised from the bottom of the bath 2 by supports, if desired, to effect more uniform transfer of heat. The heater 3 is then started which gradually heats the contents of the cylinder and causes the same to volatilize and create an accumulation of gas at the top of the cylinder, under an appreciable pressure though without effecting any substantial increase of temperature. It is obvious that with more rapid heating a more rapid volatilization of the liquid will be produced and an increased temperature may be attained, but in the present exemplification of the process it is not desirable to appreciably pre-heat the vaporized sulfur dioxide. The nozzles 5 5′ are preferably placed in the upper part of the car near each end and so attached (at or near the top) that they may be readily removed. For example, they may be suspended from the roof of the car by a staple 21 and cord 22. The door of the car is then closed, except for an aperture sufficient to permit the tube 4 to pass through.

When a sufficient pressure has been developed in the gas cylinder as indicated by the pressure gauge 12, (for example as high as 60 lbs. per square inch) the valve 13 is opened thereby permitting the exit of a stream of the sulfur dioxide gas into tube 4, and through tubes 4′ 4″ to the aspirating nozzle 5 (and 5′). Upon entering the nozzle through the conical aperture 16 the velocity of the stream is appreciably increased. Accordingly it passes directly across the intervening space 16′ and through the conical aperture 17 (which is appreciably larger than 16) thence across space 17′ and through conical aperture 18 (which is again larger) from which it emerges into the cylindrical portion 19 of the nozzle and leaves from the open end 20 into the air space of the car.

In this manner it is to be noted that the gaseous stream contacts tangentially with the air contained in the space 16′ and draws a considerable volume of air along with it in the form of a surrounding sheath or circular zone of air and mixed air and sulfur dioxide. The next aperture 17, being larger than the first and conical in shape receives and directs the combined stream of sulfur dioxide, air, and air-sulfur dioxide mixture therethrough. Upon passing through the second aperture the components of the stream are further mingled and also directed toward the third conical aperture 18. In traversing the intervening space 17′ the stream frictionally accumulates more of the surrounding air and carries it through aperture 18 into the cylinder. Beyond the aperture, 18 at 18′ there may be provided openings in the periphery of the cylindrical portion, whereby further introduction of air may be effected. The air-sulfur dioxide mixture now passes through the cylindrical tube and is intimately commingled by internal friction and eddy currents as well as by frictional resistance with the walls of the tube, and finally emerges (at 20) in the condition of a relatively uniform gaseous mixture with respect to distribution of the components of which it is composed and the state of physical aggregation in which they are severally present.

The gaseous mixture is relatively dilute with respect to the sulfur dioxide component and hence not characterized by harmful effects upon even those grapes in the immediate vicinity against which the stream may directly impinge. On the other hand, on account of the density of sulfur dioxide, the mixture is of somewhat greater specific gravity than the air and consequently tends to settle by gravity as well as under the direct impetus of the gaseous stream behind it. Consequently the mixture passes downwardly through the interstices between the grapes as well as between the boxes in which they are packed, displacing and mixing with the air already contained in such spaces. Concurrently, the air introduced into the gas stream through air spaces 16', 17', 18' is replaced by air in the top of the car which draws air up from the spaces around the sides of the car and this still further assists the downward penetration of the gas mixture. At the same time no appreciable loss of sulfur dioxide occurs through the doorway of the car and the air in the car circulates as a closed system.

Upon completion of the treatment, which may be readily judged and controlled from a knowledge of the volume of the car the pressure and the time of treatment, or by the loss in weight of the container, the valves 12 are closed. The nozzles 5, 5' are dislodged from the cord and staple fastenings which are broken by jerking the tubes 4' 4'' and the latter are thereupon removed from the car. The car is then closed and sealed for shipment, and the grapes are found to be substantially preserved for a week or longer, even under severe conditions of transit without undergoing the usual forms of deterioration such as mold, decay, softening, etc. If a longer period is required for transportation the car may be again treated in this manner if it should be deemed necessary.

It is to be especially noted that, in the particular adaptation of the method to the treatment of fruits with sulfur dioxide, if any of the fruit is moist from sweating or from the deposit of dew or mere adsorption of water vapor on its surface, and especially if any of the fruit is bruised in such manner as to expose the interior which is moist with the usual fruit juices, such areas are extremely absorptive of sulfur dioxide. Consequently, if such surfaces are exposed to high concentrations of sulfur dioxide, even though it be for but a few minutes only, they will absorb an excessive quantity of the sulfur dioxide and not only make the fruit undesirable by bleaching the color in some cases or making it subject to a more rapid deterioration and spoiling, but also render it unfit for human consumption as a food on account of the poisonous characteristics of sulfur dioxide when taken in appreciable quantities.

When the influx of sulfur dioxide is uniformly distributed through a relatively larger volume of air, however, by the operation of the apparatus just described, such concentrations do not occur and hence there is no danger of any portion of the fruit being overtreated. Moreover, the already partially diluted gas diffuses more readily with the air than a concentrated or pure gas is susceptible of doing and manifests a ready penetrability of the air with which it mixes and which it partially displaces from both the interstitial spaces and from the exposed surfaces of the fruit. Furthermore, after being thus mingled and disseminated throughout the voids it does not tend to segregate from the air nor to concentrate or condense upon adjacent surfaces.

The adaptation of the invention to the treatment of grapes has been described as a preferred and representative instance of its practical application. However, it is to be understood that various modifications of the same may be made and that it may be employed for innumerable specific purposes accordingly within the scope of the invention here disclosed.

I claim:

1. A method for uniformly distributing and diffusing a gaseous reagent material through a fluid medium, enclosed in a suitable container, comprising injecting a fine stream of the reagent at high velocity into the container and simultaneously cycling a portion of the fluid medium from the container into the gaseous stream at a point prior to its entrance into the container, thereby to reduce the concentration and vapor pressure of the stream of gaseous reagent entering the container.

2. A method for uniformly distributing and diffusing a gaseous reagent material throughout an irregularly disposed volume of a fluid medium enclosed in a suitable container, comprising injecting a fine stream of the reagent at high velocity into one part of the container, simultaneously withdrawing the fluid medium from another part of the container and cycling the same into the stream of gaseous reagent at a point prior to its entrance into the container thereby to reduce the concentration and vapor pressure of the entering stream of gaseous reagent, and setting up a circulatory current throughout the irregular spaces and confines of the entire volume of the fluid medium.

3. A method for the addition and uniform diffusion of a volatilizable reagent throughout an irregularly disposed volume of a fluid medium enclosed in a suitable container, comprising supplying heat to the reagent to volatilize the same, injecting a stream of the gas at high velocity into the fluid medium, and cycling a portion of the fluid medium into said stream in advance of the point at which the stream enters the fluid medium.

4. A method for the regulated addition and uniform diffusion of a volatile reagent into and through an irregularly disposed volume of the fluid medium contained in the interstices between materials enclosed in a suitable container, comprising volatilizing the reagent, conducting the resulting gas in the form of a fine stream into one part of the enclosed fluid medium, simultaneously withdrawing the medium from another part of the enclosed fluid, and introducing the same into the reagent stream and leading the combined gaseous stream into the fluid medium.

5. A method for the regulated addition and uniform diffusion of a volatile reagent into and through an irregularly disposed volume of a fluid medium contained in the interstices between and surrounding materials enclosed in a suitable container, comprising volatilizing the reagent to generate a high pressure of the same, conducting the resulting gas in the form of a fine stream into one part of the enclosed fluid medium, withdrawing the medium from another part of the enclosed fluid medium, and simultaneously introducing air into the reagent stream.

6. A method for the regulated addition and uniform diffusion of a volatile reagent into and through an irregularly disposed volume of a gaseous medium contained in the interstices between materials enclosed in a suitable container, comprising supplying heat to the reagent to volatilize the same and generate a high pressure, conducting the resulting gas in the form of a fine stream into one part of the enclosed gaseous medium, introducing air into the reagent stream, and thereafter leading the combined gaseous stream into the medium with which it is to be diffused.

7. A method for the regulated addition and uniform diffusion of a volatile reagent into and through an irregularly disposed volume of a gaseous medium contained in the interstices between materials enclosed in a suitbale container, comprising supplying heat to the reagent to volatilize and generate a high pressure of the same without effecting appreciable rise in temperature of the resulting gas, conducting the latter in the form of a fine stream into the gaseous medium, introducing air into the reagent stream, and thereafter leading the combined gaseous stream into the gaseous medium.

8. A method for the regulated addition and uniform diffusion of a volatile reagent into and through an irregularly disposed volume of a gaseous medium contained in the interstices between materials enclosed in a suitable container, comprising volatilizing the reagent conducting the resulting gas in the form of a fine stream into one part of the enclosed gaseous medium, introducing air into the reagent stream with concurrent reduction of pressures and concurrent reduction of temperature in the reagent stream, and thereafter leading the combined stream of cooled gases into the gaseous medium.

9. A method for the regulated addition and uniform diffusion of a volatile reagent into and through an irregularly disposed volume of a gaseous medium, comprising providing an open space adjacent to openings into the irregularly disposed volume of the medium, volatilizing the reagent, conducting the volatized reagent into the open space, in the form of a fine stream, withdrawing the medium from another part of the open space and introducing air into the reagent stream prior to its entrance into the gaseous medium to be treated.

10. A method for the regulated addition and uniform diffusion of a volatile reagent into and through an irregularly disposed volume of a gaseous medium, comprising providing an open space adjacent to openings into the irregularly disposed volume of the medium, volatilizing the reagent, conducting the volatilized reagent into the open space in the form of a fine stream, withdrawing the medium from another part of the open space and introducing air in relatively large volumes into the reagent stream at a plurality of points prior to its entrance into the gaseous medium to be treated.

11. A method for uniformly distributing and diffusing sulfur dioxide gas throughout an irregularly disposed volume of air, enclosed in a suitable container, and surrounding materials such as fruit or the like to be treated with the sulfur dioxide, comprising injecting a fine stream of the gas at high velocity into the container, simultaneously cycling a portion of the air into the stream of sulfur dioxide at a point prior to its entrance into the container, thereby to reduce the concentration and vapor pressure of the stream of sulfur dioxide entering the chamber.

12. A method for the addition and uniform diffusion of liquid sulfur dioxide throughout an irregularly disposed volume of air, enclosed in a suitable container, and surrounding materials, such as fruit or the like to be treated with the sulfur dioxide comprising supplying heat to the sulfur dioxide to volatilize the same, injecting a stream of the gas at high velocity into said irregularly disposed volume of air, and cycling a portion of the air into said stream in advance of the point at which the stream enters the fluid medium.

13. A method for the regulated addition and uniform diffusion of liquid sulfur dioxide into and through an irregularly disposed volume of air, contained in the interstices between materials such as fruit enclosed in a suitable container, comprising supplying heat to the liquid sulfur dioxide to volatilize and generate a high pressure in the resulting gas, without appreciable rise in temperature, conducting the latter in the form of a fine stream into said irregularly disposed volume of air, introducing air into the sulfur dioxide stream, and thereafter leading the combined gaseous stream into the gaseous medium.

Signed by me at Boston, Massachusetts, this twenty-ninth day of May, 1926.

FREDERIC A. EUSTIS.